United States Patent
Chang et al.

(10) Patent No.: US 8,575,901 B2
(45) Date of Patent: Nov. 5, 2013

(54) AUTO-SELECTING HOLDING CURRENT CIRCUIT

(75) Inventors: Lon-Kou Chang, Hsinchu (TW); Hsing-Fu Liu, Hsinchu (TW); Chang-Yu Wu, Hsinchu (TW); Li-Wei Yen, Hsinchu (TW)

(73) Assignee: Macroblock, Inc., Hsinchu (TW)

( * ) Notice: Subject to any disclaimer, the term of this patent is extended or adjusted under 35 U.S.C. 154(b) by 100 days.

(21) Appl. No.: 13/410,034

(22) Filed: Mar. 1, 2012

(65) Prior Publication Data

US 2013/0009616 A1 Jan. 10, 2013

(30) Foreign Application Priority Data

Jul. 6, 2011 (TW) .............................. 100123920 A

(51) Int. Cl.
  *G05F 1/40* (2006.01)
  *H05B 41/36* (2006.01)
(52) U.S. Cl.
  USPC ........................... 323/241; 315/219; 315/307
(58) Field of Classification Search
  USPC ......... 323/212, 217, 237, 239, 241, 246, 905; 315/209 R, 219, 291, 307
  See application file for complete search history.

(56) References Cited

U.S. PATENT DOCUMENTS

| | | | |
|---|---|---|---|
| 7,872,427 B2 | 1/2011 | Scianna | |
| 8,111,017 B2 * | 2/2012 | Lin et al. | 315/307 |
| 8,294,379 B2 * | 10/2012 | Liu et al. | 315/224 |
| 2008/0030148 A1 * | 2/2008 | Tang et al. | 315/291 |
| 2010/0225251 A1 | 9/2010 | Maruyama | |
| 2011/0121744 A1 | 5/2011 | Salvestrini | |
| 2011/0291583 A1 * | 12/2011 | Shen | 315/287 |
| 2012/0262084 A1 * | 10/2012 | Liu | 315/250 |

* cited by examiner

*Primary Examiner* — Gary L Laxton
(74) *Attorney, Agent, or Firm* — Muncy, Geissler, Olds & Lowe, PLLC

(57) ABSTRACT

An auto-selecting holding current circuit is applicable to a converter. A primary side of the converter has a Triode for Alternating Current (TRIAC) and a bleeder circuit. The auto-selecting holding current circuit includes a first sensor module, a second sensor module and a reference voltage selecting circuit. The first sensor module detects an input current drop time or an input voltage drop time to output a sense signal. The second sensor module receives a current detector signal and outputs a critical current signal to detect a holding-current value range of the TRIAC. The reference voltage selecting circuit outputs a reference current signal to the bleeder circuit, and the reference current signal corresponds to a holding-current value of the TRIAC. Therefore, the bleeder circuit maintains normal operation of the TRIACs with different holding-current values.

10 Claims, 16 Drawing Sheets

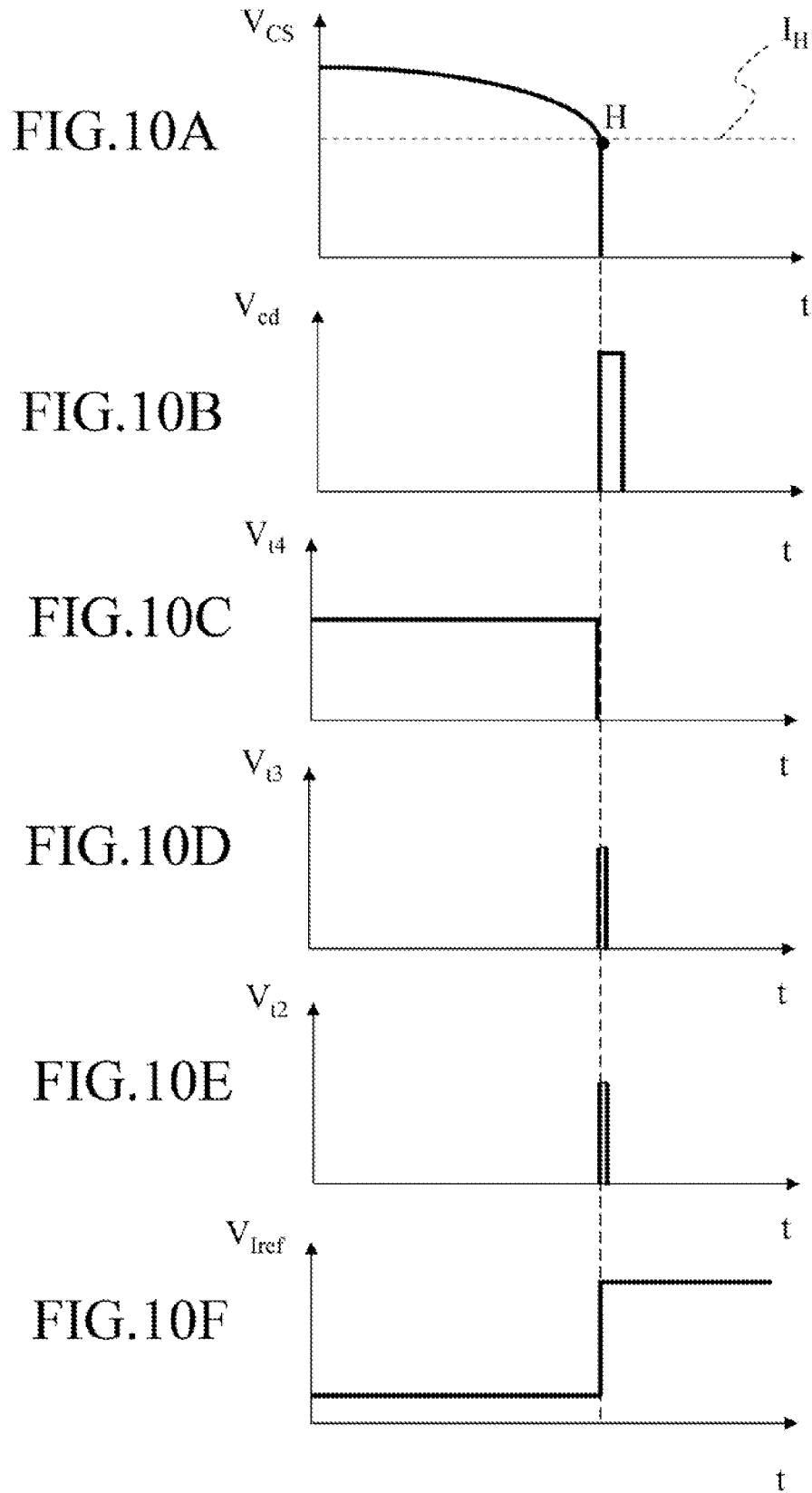

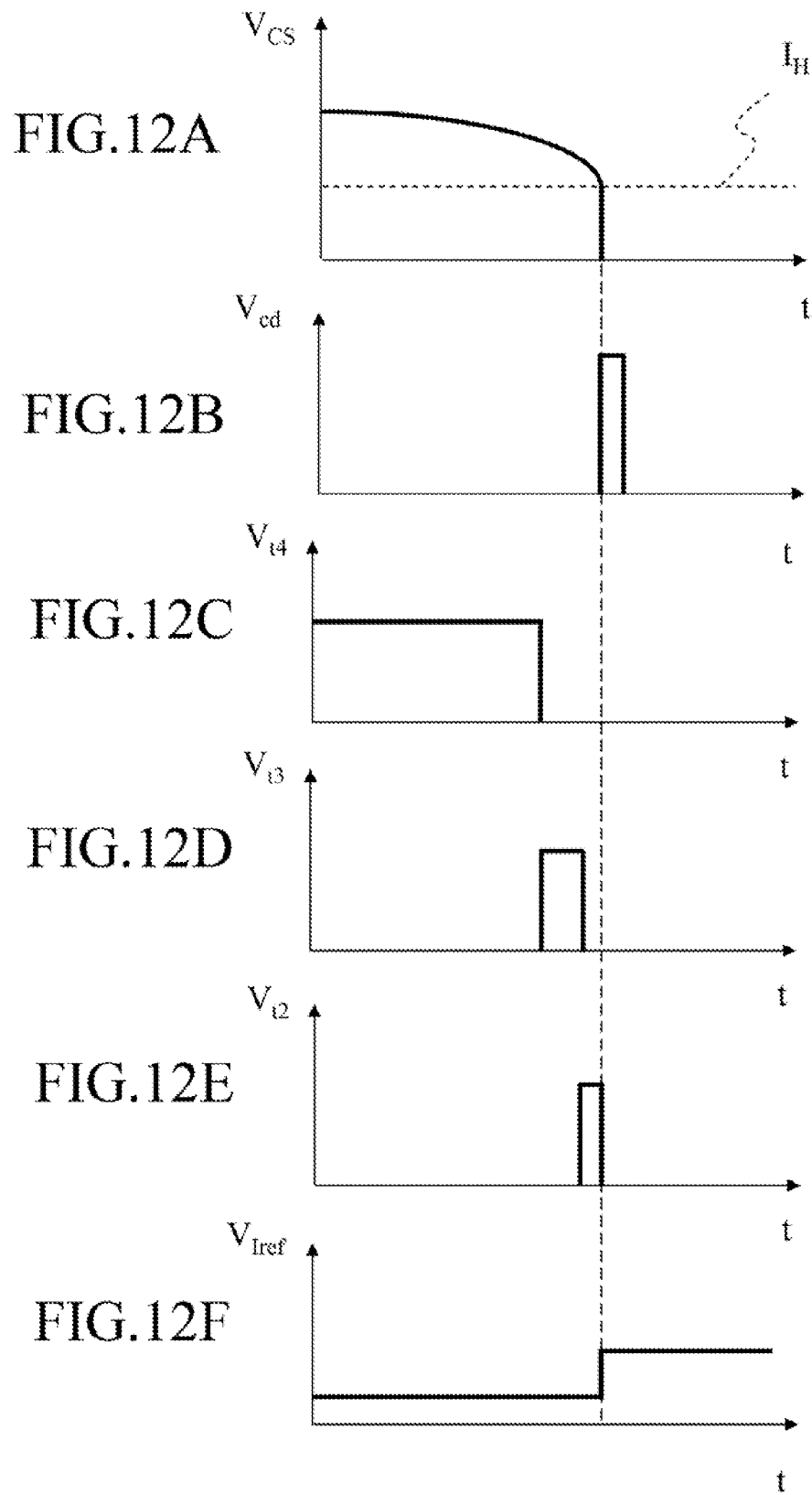

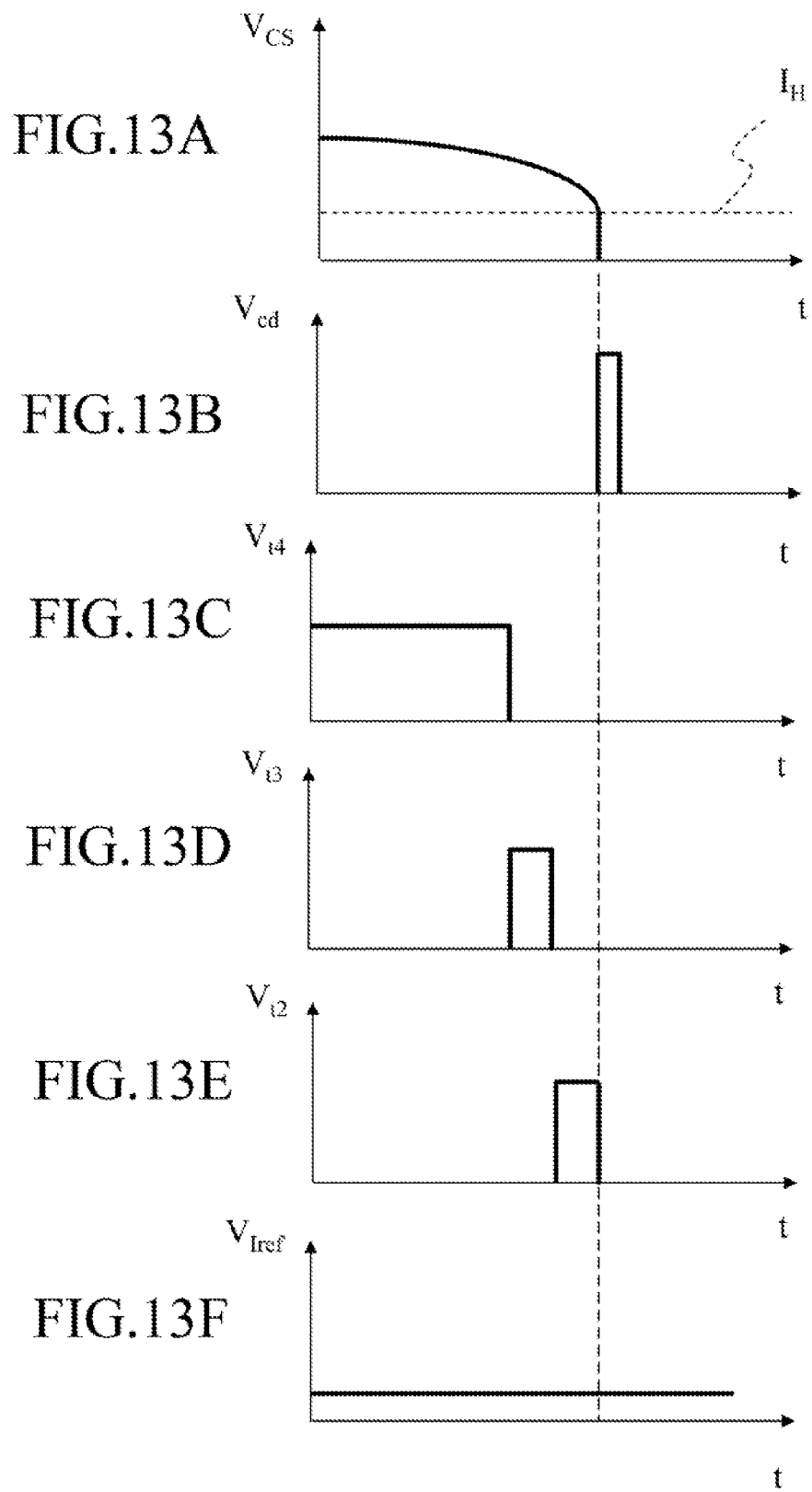

AUTO-SELECTING HOLDING CURRENT CIRCUIT

CROSS-REFERENCE TO RELATED APPLICATIONS

This non-provisional application claims priority under 35 U.S.C. §119(a) on Patent Application No(s). 100123920 filed in Taiwan, R.O.C. on Jul. 6, 2011, the entire contents of which are hereby incorporated by reference.

BACKGROUND

1. Technical Field

The disclosure relates to an auto-selecting holding current circuit, and more particularly to an auto-selecting holding current circuit capable of being coupled to different Triodes for Alternating Current (TRIACs).

2. Related Art

With the rapid development of science, technology and economy, people have higher and higher requirements on the quality of life, which, however, leads to the gradual exhaustion of crude oil reserves. In recent years, with the rise of the environmental protection awareness, various green energy industries have attracted global attentions, in which an illumination-related energy saving requirement becomes one of the important indexes.

Generally speaking, power consumption of illuminators is usually too high. When strong illumination is not needed, energy can be saved effectively if the illumination of the illuminator can be lowered. Common dimmers include TRIAC dimmers, electronic dimmers, and remote control dimmers (such as infrared or radio frequency remote control dimmers).

The TRIAC dimmer mainly includes a TRIAC for changing the input power of a light, and one of the TRIAC features is the holding-current value. When the TRIAC is triggered, the TRIAC maintains a conducting state. When the current flowing through the TRIAC drops below the holding-current value, the TRIAC is closed (or cut off). To decrease the luminance of the illuminator, both the input voltage and the input current of the illuminator are decreased, which causes the TRIAC to be closed earlier than expected since the current flowing through the TRIAC is smaller than the holding-current value, and further causes the TRIAC misfire and illuminator to flicker. In order to solve the above problems, a conventional method for adding a bleeder circuit (or dummy load) in the TRIAC dimmable LED driver is adopted, so that the current flowing through the TRIAC is higher than the holding-current value even when the TRIAC current is decreased, therefore maintaining normal functions of the TRIAC. A common bleeder circuit transmits an extra current extracted from an input voltage to the TRIAC by connecting a constant resistor to the input voltage in parallel, so that the current flowing through the TRIAC is greater than the holding-current value, therefore maintaining the TRIAC turned-on. However, the above method fails to achieve an effect of dynamically compensating for the exact amount of current that the TRIAC lacks. Therefore, a conventional adaptive bleeder circuit is provided to dynamically satisfy the current needed by the TRIAC. However, the adaptive bleeder circuit is merely applicable to the TRIAC having a specific holding-current value. The same adaptive bleeder circuit is not applicable to another TRIAC having a different holding-current value. Therefore, the conventional adaptive bleeder circuit is inconvenient in use.

SUMMARY

The disclosure is an auto-selecting holding current circuit, so as to solve a problem that the conventional adaptive bleeder circuit is not applicable to TRIACs having different holding-current values.

An auto-selecting holding current circuit according to the disclosure is applicable to a converter. In an embodiment, an input voltage which is input into the primary side of the converter is adjusted by a TRIAC. The primary side is connected with the TRIAC having a holding-current value. In order to maintain the TRIAC turned on, a bleeder circuit is mounted at the primary side, and makes an input current flowing through the TRIAC be greater than or equal to the holding current value according to an input current detector signal and a reference current signal. When the current signal which is supplied to the converter is smaller than a reference level, the bleeder circuit will output a current to maintain the TRIAC turned-on. However, the different TRIACs have different holding current value. Therefore, the auto-selecting holding current circuit is used to detect the TRIAC holding-current value and modify the bleeder reference voltage level. The auto-selecting holding current circuit comprises a first sensor module, a second sensor module and a reference voltage selecting circuit. The first sensor module senses a current drop time of the current detector signal or voltage drop time of the input voltage, so as to detect when the TRIAC is turned off and, therefore, outputs a sense signal. The second sensor module receives the current detector signal and outputs a critical current signal used to detect a current value range when the TRIAC is turned off. The current range stands for the TRIAC holding-current value. The reference voltage selecting circuit outputs the reference current signal to the bleeder circuit according to the sense signal and the critical current signal. Therefore, based on the reference current signal, the bleeder circuit maintains the input current of the converter be greater than or equal to the holding-current value.

In the auto-selecting holding current circuit according to the disclosure, through the sense signal output by a first sensor module and the critical current signal output by the second sensor module, the reference voltage selecting circuit obtains a holding-current-value range of the TRIAC to output the corresponding reference current signal to the bleeder circuit, so that the bleeder circuit dynamically adjusts a pulse modulation signal to make the TRIAC operate normally.

BRIEF DESCRIPTION OF THE DRAWINGS

FIG. 10A to FIG. 10F are respectively time-sequence oscillograms of a current detector signal, a sense signal, a critical current signal and a reference current signal when a holding-current value of a TRIAC is greater than a third preset current signal according to FIG. 9;

FIG. 12A to FIG. 12F are respectively time-sequence oscillograms of a current detector signal, a sense signal, a critical current signal and a reference current signal when a holding-current value of a TRIAC is between a first preset current signal and a second preset current signal according to FIG. 9;

FIG. 13A to FIG. 13F are respectively time-sequence oscillograms of a current detector signal, a sense signal, a critical current signal and a reference current signal when a holding-current value of a TRIAC is smaller than a first preset current signal according to FIG. 9;

DETAILED DESCRIPTION

Figure 1:
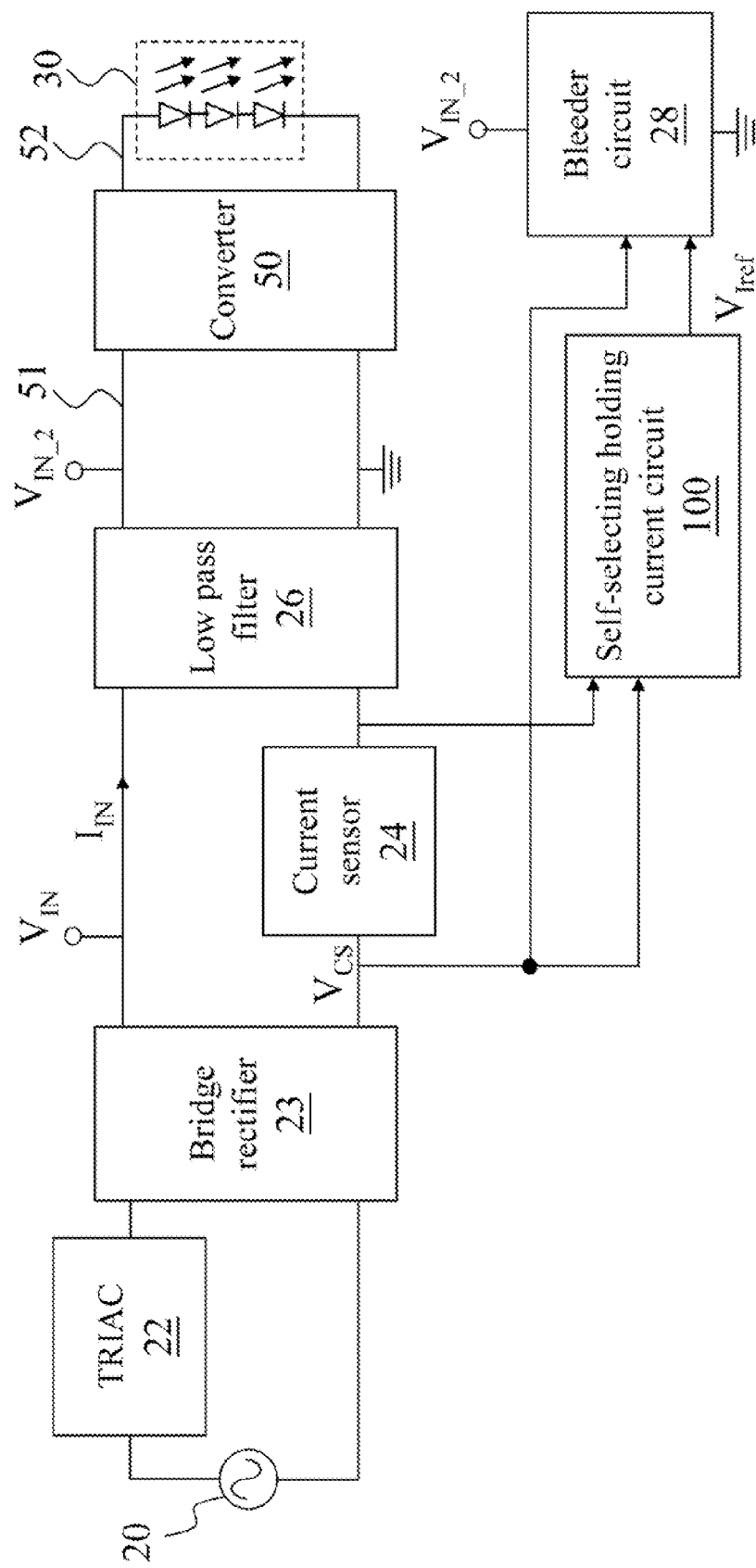
FIG. 1 is a circuit block diagram of a bleeder circuit applied in a converter according to an embodiment of the disclosure.

FIG. 1 is a circuit block diagram in which a bleeder circuit is applied in a converter according to an embodiment of the disclosure. A bleeder circuit 28 may be applied to a converter 50. The converter 50 may be, but is not limited to, an Isolated Converter. That is to say, the converter 50 may also be a Buck Converter, Boost Converter, Buck-boost Converter, Forward Converter, a Half-bridge Converter, a Full-bridge Converter, a Push-Pull Converter or a Flyback Converter.

The converter 50 has a primary side 51 and a secondary side 52. The primary side 51 has an alternating current (AC) signal source 20, a TRIAC 22, a bridge rectifier 23, a current sensor 24, a low pass filter 26 and the bleeder circuit 28. The secondary side 52 has a load 30, and the load 30 may be, but is not limited to, Light-Emitting Diodes (LEDs). The primary side 51 is supplied with a voltage $V_{IN\_2}$ which is output by the low pass filter 26 with an input of an input voltage $V_{IN}$. The input voltage $V_{IN}$ is the output of the AC signal source 20 passing through the TRIAC 22 and rectified by the bridge rectifier 23.

Figure 2:
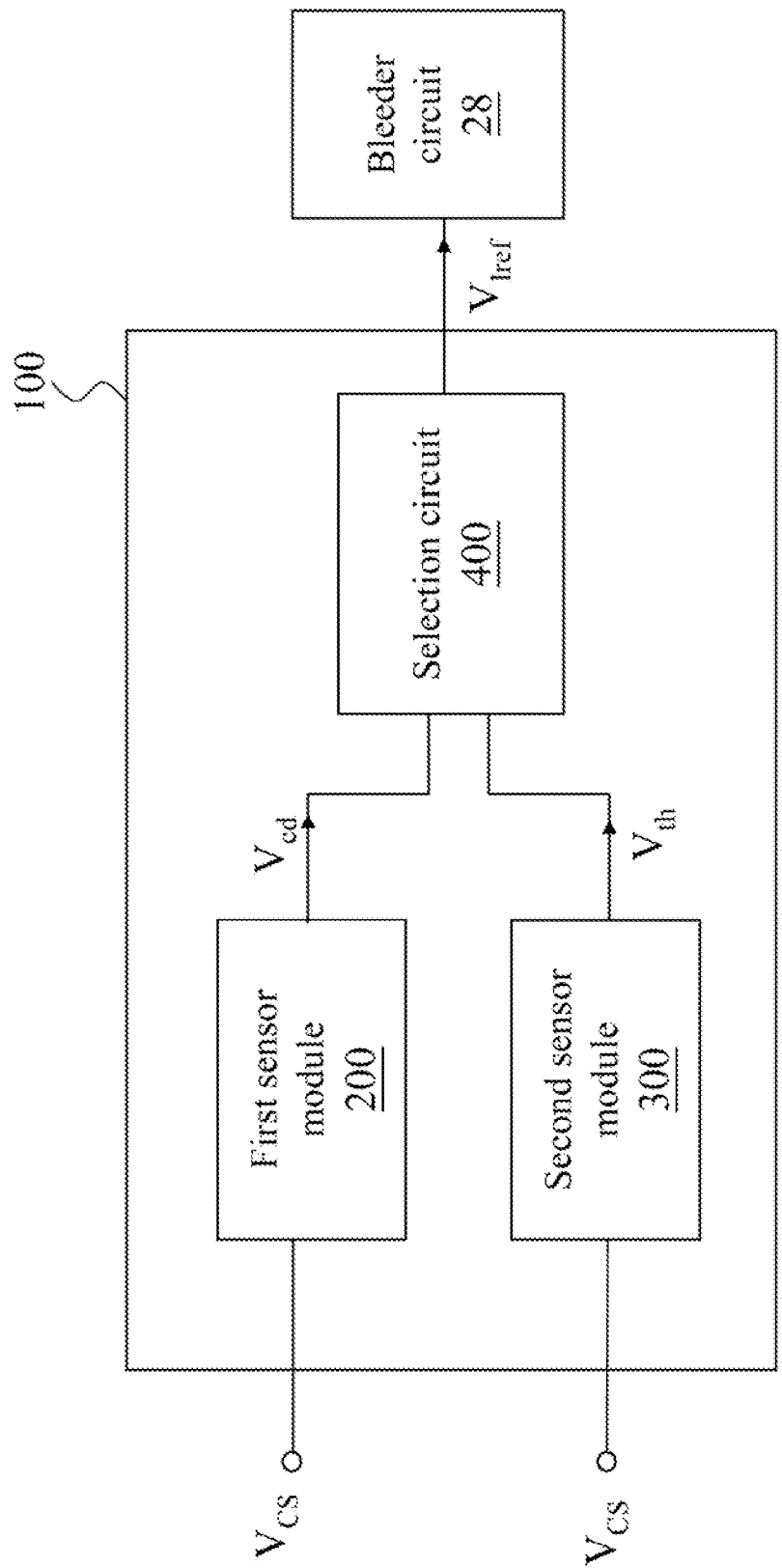
FIG. 2 is a circuit block diagram of an auto-selecting holding current circuit according to FIG. 1.
Figure 3:
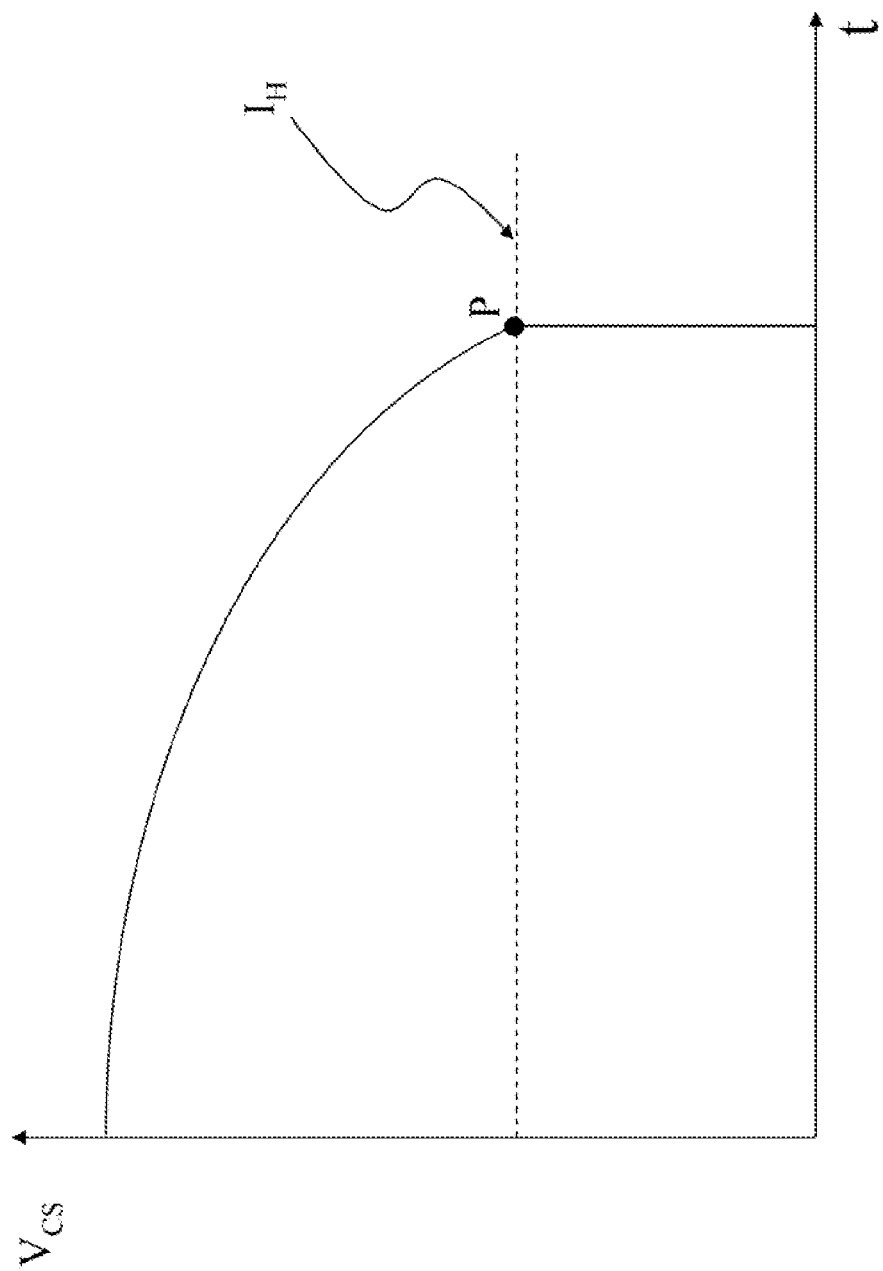
FIG. 3 is a schematic time-sequence oscillogram of a current detector signal of FIG. 1.

FIG. 2 is a circuit block diagram of an auto-selecting holding current circuit according to FIG. 1. In the FIG. 1 and FIG. 2, an auto-selecting holding current circuit 100 which is connected to the primary side 51 comprises a first sensor module 200, a second sensor module 300 and a reference voltage selecting circuit 400. The first sensor module 200 is connected to the current sensor 24. The first sensor module 200 senses a current drop time (i.e. a current drop when the TRIAC 22 is cut off, for example, the point P in FIG. 3) of a current detector signal $V_{CS}$ output by the current sensor 24 (referring to FIG. 3, which is a schematic time-sequence oscillogram of a current detector signal of FIG. 1), and then output a sense signal $V_{cd}$. The second sensor module 300 receives the current detector signal $V_{CS}$ and outputs a critical current signal $V_{th}$, in which the critical current signal $V_{th}$ is used to detect the holding-current value $I_H$ of the TRIAC 22. The reference voltage selecting circuit 400 outputs a reference current signal $V_{Iref}$ to the bleeder circuit 28 according to the sense signal $V_{cd}$ and the critical current signal $V_{th}$. The reference current signal $V_{Iref}$ corresponds to the holding-current value $I_H$ of the TRIAC 22. According to the current detector signal $V_{CS}$ and the reference current signal $V_{Iref}$, the bleeder circuit 28 maintains the input current $I_{IN}$ of the converter, which flows through the TRIAC 22, to be greater than or equal to the holding-current value $I_H$, so as to make the TRIAC 22 operates normally.

Figure 4:
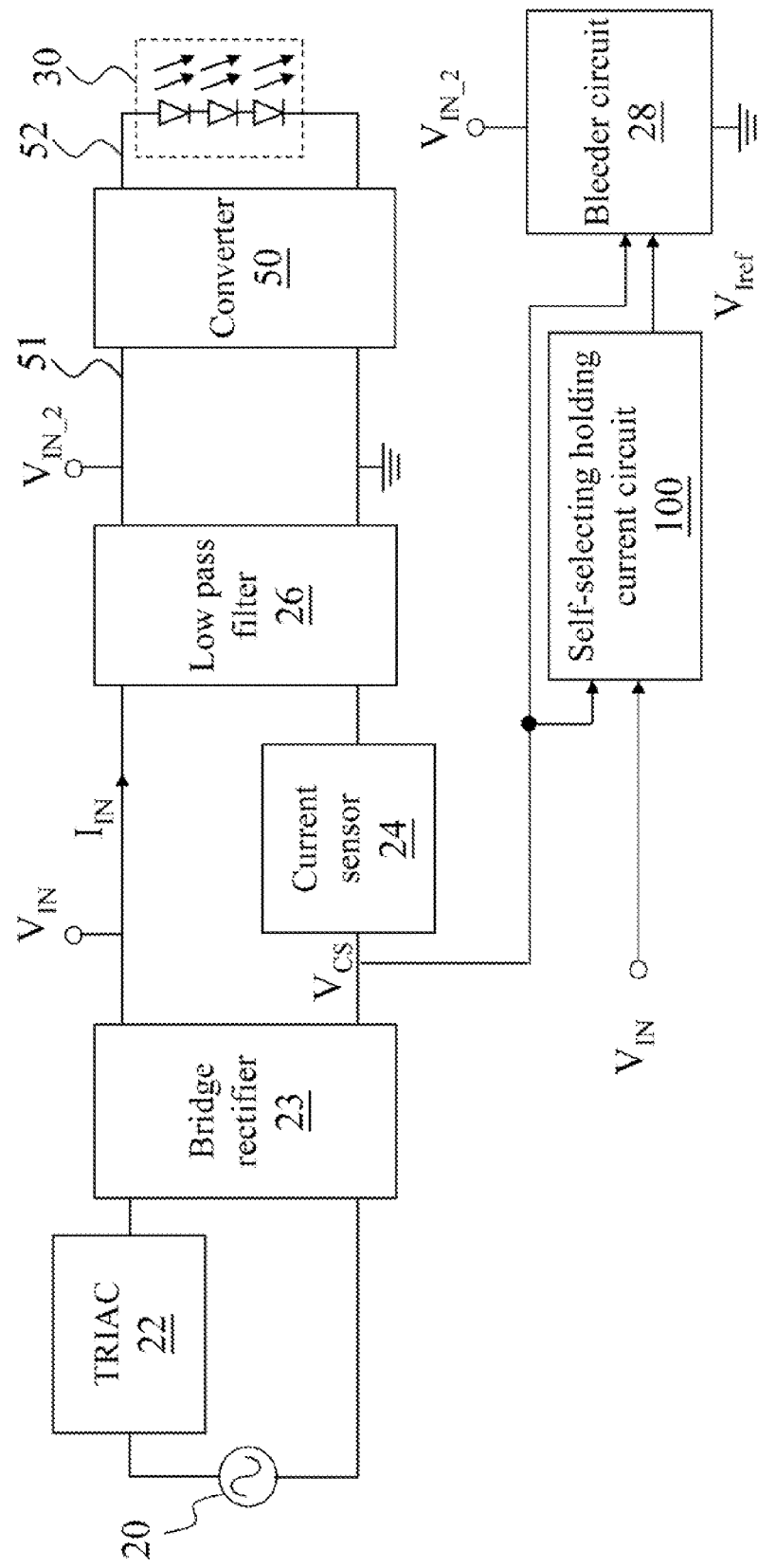
FIG. 4 is a circuit block diagram of a bleeder circuit applied in a converter according to another embodiment of the disclosure.

It should be noted that, since the current detector signal $V_{CS}$ corresponds to the input current $I_{IN}$ flowing through the TRIAC 22, and since the input current $I_{IN}$ corresponds to the input voltage $V_{IN}$, the changes of the current detector signal $V_{CS}$ are the same as those of the input voltage $V_{IN}$. As a result, the first sensor module 200 may also be used to sense a voltage drop time of the input voltage $V_{IN}$ (i.e. a voltage drop when the TRIAC 22 is turned off), and then output the sense signal $V_{cd}$ (referring to FIG. 4, which is a circuit block diagram in which a bleeder circuit is applied in a converter according to another embodiment of the disclosure). It is taken as examples in the following embodiments that the first sensor module 200 senses the current drop of the current detector signal $V_{CS}$, but these examples are not intended to limit the scope of the disclosure.

Figure 5:
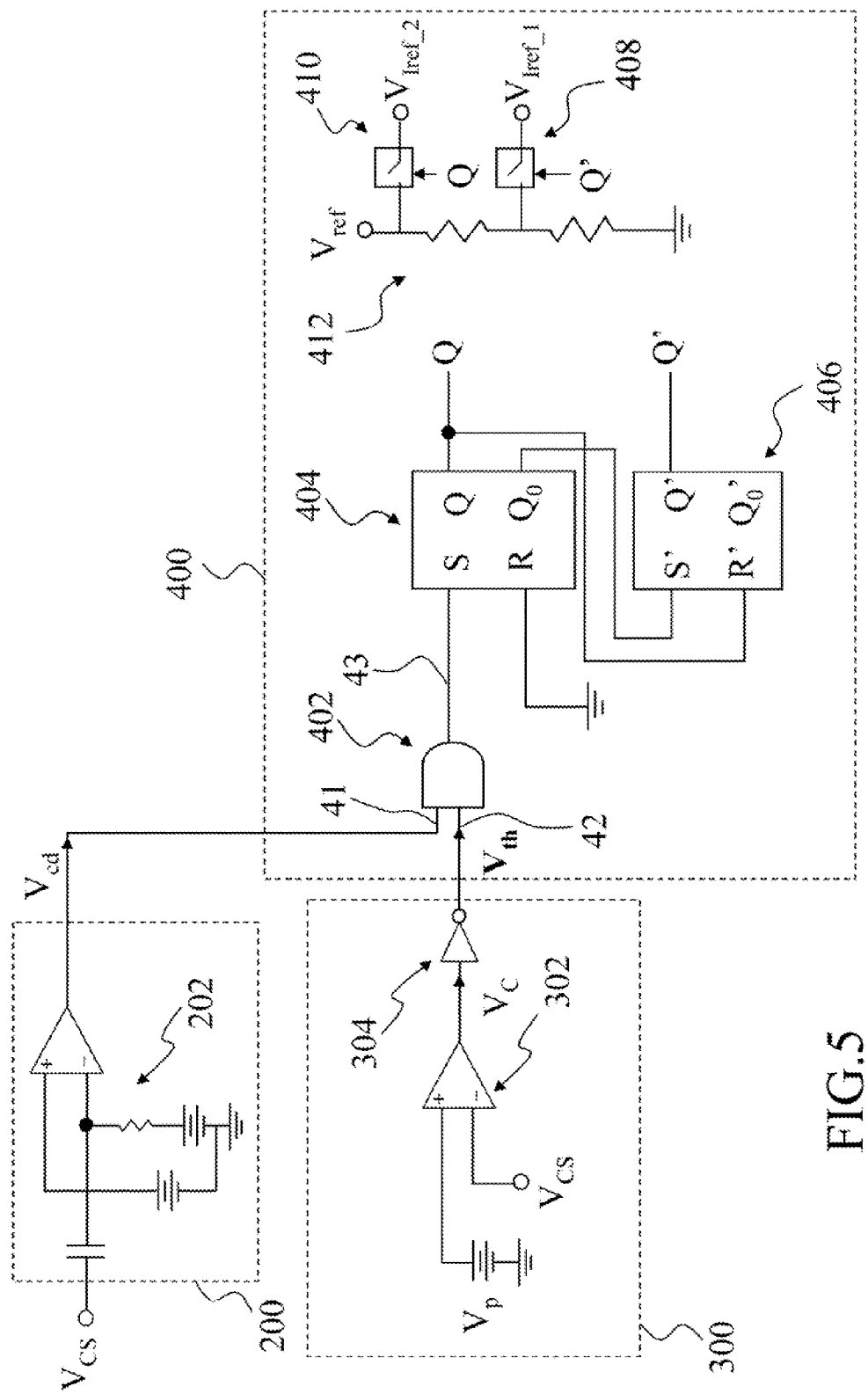
FIG. 5 is a schematic structural view of a circuit of a bleeder circuit according to a first embodiment of the disclosure.
Figure 6B:
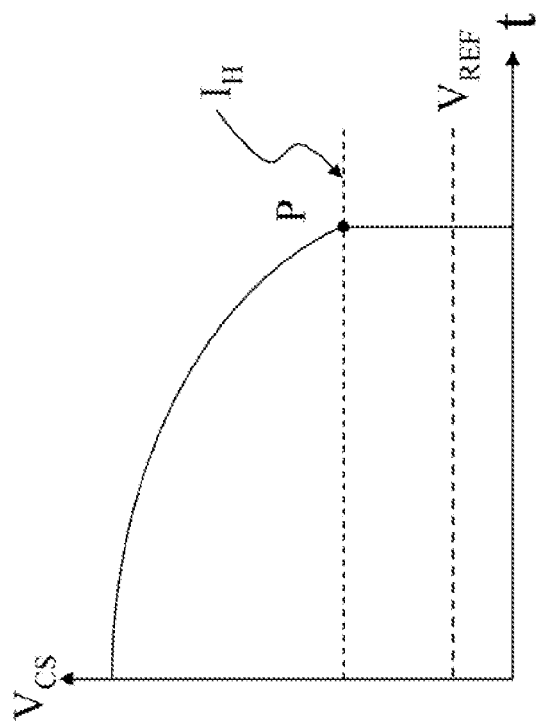
FIG. 6B is a schematic time-sequence oscillogram of a reference voltage and a current detector signal according to FIG. 6A.
Figure 6A:
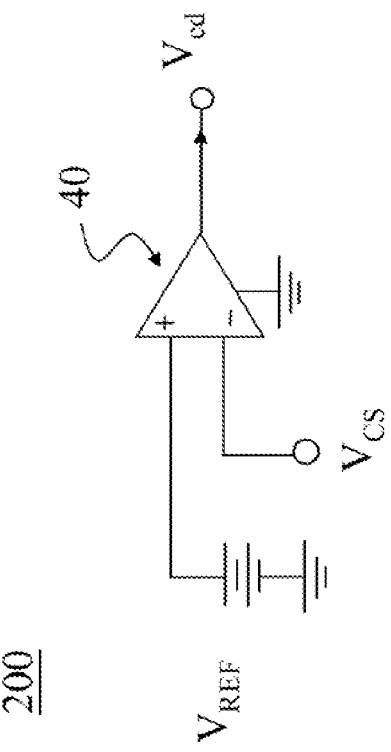
FIG. 6A is a schematic structural view of a circuit of a first sensor module according to another embodiment.
Figure 7A:
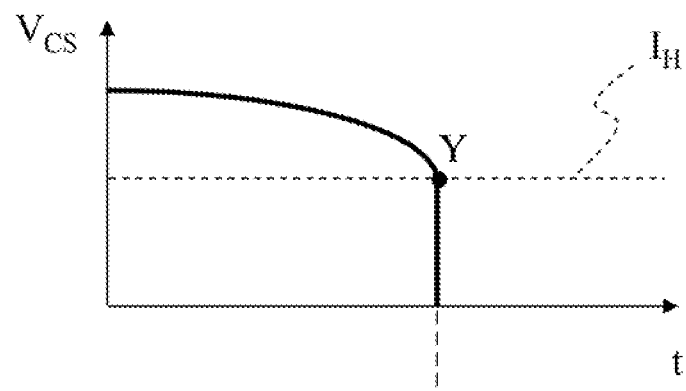
FIG. 7A to FIG. 7D are respectively time-sequence oscillograms of a current detector signal, a sense signal, a critical current signal and a reference current signal when a holding-current value of a TRIAC is greater than a preset current signal according to FIG. 5.
Figure 7B:
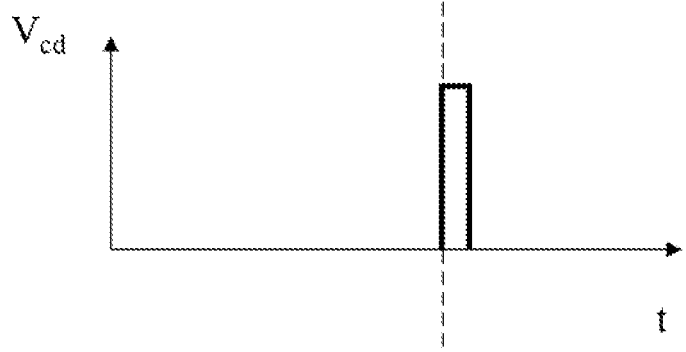
Figure 7C:
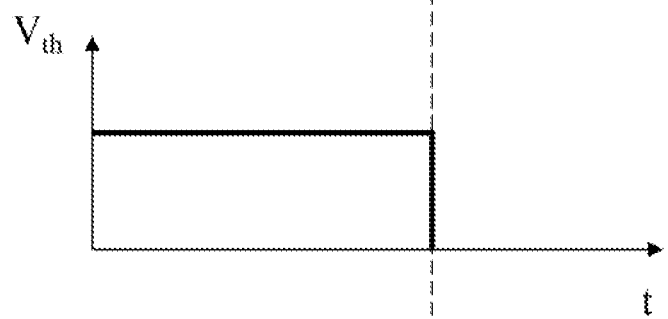
Figure 7D:
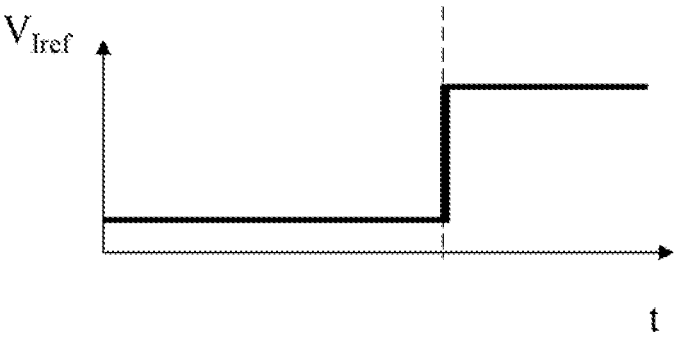
Figure 8A:
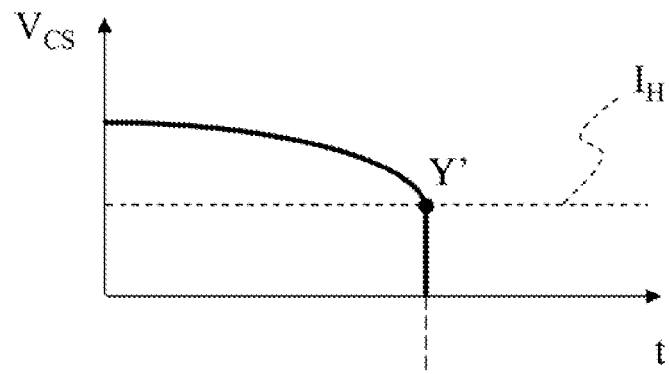
FIG. 8A to FIG. 8D are respectively time-sequence oscillograms of a current detector signal, a sense signal, a critical current signal and a reference current signal when a holding-current value of a TRIAC is smaller than a preset current signal according to FIG. 5.
Figure 8B:
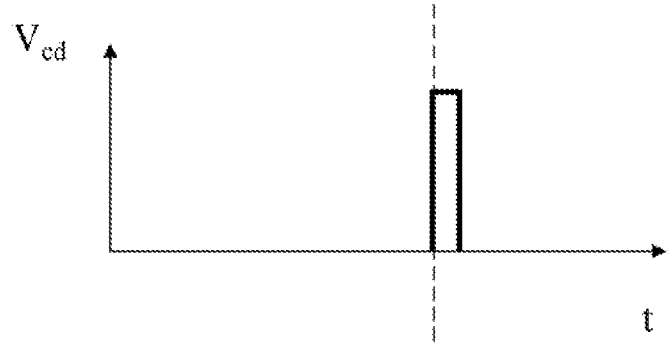
Figure 8C:
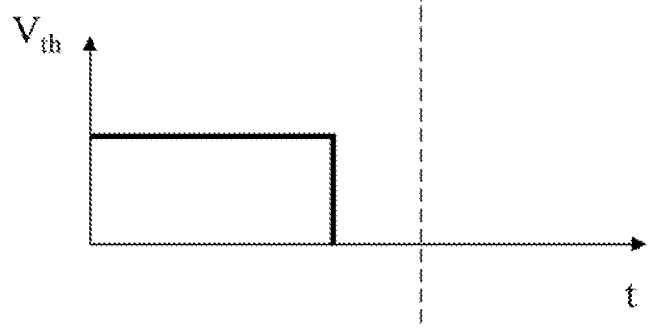
Figure 8D:
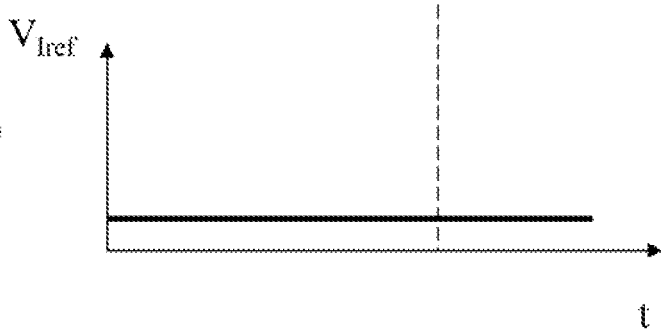

FIG. 5 is a schematic structural view of a circuit of an auto-selecting holding current circuit according to a first embodiment of the disclosure. In the embodiment, a first sensor module 200 comprises a differentiator 202 which senses a current drop time for outputting a sense signal $V_{cd}$ to a reference voltage selecting circuit 400. However, the embodiment is not intended to limit the disclosure. FIG. 6A is a schematic structural view of a circuit of a first sensor module according to another embodiment of the disclosure and FIG. 6B is a schematic time-sequence oscillogram of a reference voltage and a current detector signal according to FIG. 6A. The first sensor module 200 may also comprise a comparator 40. The comparator 40 receives a current detector signal $V_{CS}$ and compares the current detector signal $V_{CS}$ to a reference voltage $V_{REF}$, and thereby, output the sense signal $V_{cd}$. The reference voltage $V_{REF}$ is smaller than a feedback signal value of a holding-current value $I_H$ of the TRIAC 22, wherein the feedback signal value of the holding-current value $I_H$ is the current detector signal $V_{CS}$ output by a current sensor 24 while a current equal to the holding-current value $I_H$ flows through the current sensor 24.

Further referring to FIG. 5, a second sensor module 300 comprises a comparator 302 and a first NOT gate 304. The comparator 302 receives the current detector signal $V_{CS}$ and outputs a comparison signal $V_C$ after comparing the current detector signal $V_{CS}$ with a preset current signal $V_p$. The first NOT gate 304 receives the comparison signal $V_C$ and outputs a critical current signal $V_{th}$ to a reference voltage selecting circuit 400.

The reference voltage selecting circuit 400 comprises a second AND gate 402, a first reset-set (RS) flip-flop 404, a second RS flip-flop 406, a switch element 408, a switch element 410 and a voltage divider 412. An input end 41 of the second AND gate 402 is coupled to the first sensor module 200, and an input end 42 of the second AND gate 402 is coupled to the second sensor module 300. An output end 43 of the second AND gate 402 is coupled to a set end S of the first RS flip-flop 404, and an output end Q of the first RS flip-flop 404 is coupled to a reset end R' of the second RS flip-flop 406. A reset end R of the first RS flip-flop 404 is grounded, and an output end $Q_o$ of the first RS flip-flop 404 is coupled to a set end S' of the second RS flip-flop 406. An output end Q' of the second RS flip-flop 406 and the output end Q of the first RS flip-flop 406 respectively control the switch elements 408 and 410, so that the voltage divider 412 outputs a reference current signal $V_{Iref}$. In the embodiment, the first RS flip-flop 404 and the second RS flip-flop 406 may be, but are not limited to, NAND gate RS flip-flops. However, the embodiment is not intended to limit the disclosure. In some embodiments, the first RS flip-flop 404 and the second RS flip-flop 406 may be NOR gate RS flip-flops.

Specifically, refer to FIG. 5 as well as FIG. 7A to FIG. 7D, wherein FIG. 7A to FIG. 7D are respectively time-sequence oscillograms of the current detector signal $V_{CS}$, the sense signal $V_{cd}$, the critical current signal $V_{th}$ and the reference current signal $V_{Iref}$ in the case of the holding-current value of a TRIAC being greater than a preset current signal value. When sensing a current drop (namely the point Y in FIG. 7A), the differentiator 202 outputs the sense signal $V_{cd}$ (namely a pulse signal in FIG. 7B) to the input end 41 of the second AND gate 402. That is to say, the differentiator 202 is used to detect a sudden drop time of the current detector signal $V_{CS}$. The comparator 302 receives the current detector signal $V_{CS}$ and outputs the comparison signal $V_C$ after comparing the current detector signal $V_{CS}$ with the preset current signal $V_p$ which corresponds to the preset current signal value. The first NOT gate 304 receives the comparison signal $V_C$ and outputs the critical current signal $V_{th}$ to the input end 42 of the second AND gate 402. When the current detector signal $V_{CS}$ is greater than the preset current signal $V_p$, the critical current signal $V_{th}$ is at a high level.

When the critical current signal $V_{th}$ is at the high level and the differentiator 202 outputs the sense signal $V_{cd}$, the output end 43 of the second AND gate 402 outputs the high level to the set end S of the first RS flip-flop 404, so that the output end Q of the first RS flip-flop 404 outputs the high level, and the output end Q' of the second RS flip-flop 406 outputs a low level. As the output end Q of the first RS flip-flop 404 outputs the high level, and the output end Q' of the second RS flip-flop 406 outputs the low level, the switch element 410 is actuated, and therefore the voltage divider 412 outputs a corresponding reference current signal $V_{Iref\_2}$.

Referring to FIG. 5A as well as FIG. 8A to FIG. 8D, FIG. 8A to FIG. 8D are respectively time-sequence oscillograms of the current detector signal $V_{CS}$, the sense signal $V_{cd}$, the critical current signal $V_{th}$ and the reference current signal $V_{I\_ref}$ in a case of the holding-current value of a TRIAC being smaller than the preset current signal value. When sensing a current drop (namely the point Y' in FIG. 8A), the differentiator 202 outputs the sense signal $V_{cd}$ (namely a pulse signal in FIG. 8B) to the input end 41 of the second AND gate 402. That is to say, the differentiator 202 is used to detect a sudden drop time of the current detector signal $V_{CS}$. The comparator 302 receives the current detector signal $V_{CS}$ and outputs the comparison signal $V_C$ after comparing the current detector signal $V_{CS}$ with the preset current signal $V_p$. The first NOT gate 304 receives the comparison signal $V_C$ and outputs the critical current signal $V_{th}$ to the input end 42 of the second AND gate 402. When the current detector signal $V_{CS}$ is smaller than the preset current signal $V_p$, the critical current signal $V_{th}$ is at the low level. When the critical current signal $V_{th}$ is at the low level and the differentiator 202 outputs the sense signal $V_{cd}$, the output end 43 of the second AND gate 402 outputs the low level to the set end S of the first RS flip-flop 404, so that the output end Q of the first RS flip-flop 404 outputs the low level, and the output end Q' of the second RS flip-flop 406 outputs the high level. As the output end Q of the first RS flip-flop 404 outputs the low level, and the output end Q' of the second RS flip-flop 406 outputs the high level, the switch element 408 is actuated, and therefore the voltage divider 412 outputs a corresponding reference current signal $V_{Iref\_1}$.

The sudden drop time of the current detector signal $V_{CS}$ is the moment when the input current $I_{IN}$ is smaller than the holding-current value $I_H$ which causes the TRIAC turned off. Accordingly, by setting the reference current signal $V_{Iref}$ (namely, $V_{Iref\_1}$ or $V_{Iref\_2}$) output by the reference voltage selecting circuit 400 to a value corresponding to the holding-current value $I_H$ of the TRIAC 22, the bleeder circuit 28 may control the input current $I_{IN}$ flowing through the TRIAC 22 to be greater than or equal to the holding-current value $I_H$ according to the reference current signal $V_{Iref}$ and the current detector signal $V_{CS}$ to make the TRIAC 22 operate normally.

In the first embodiment, the second sensor module 300 only can provide one single preset current signal, so the auto-selecting holding current circuit 100 is capable of providing two types of reference current signals $V_{Iref}$. However, in some embodiments, if the auto-selecting holding current circuit 100 can provide more than two types of reference current signals $V_{Iref}$, the auto-selecting holding current circuit 100 is capable of providing more than two types of reference current signals $V_{Iref}$. In the following second embodiment, it is taken as an example that the auto-selecting holding current circuit 100 provides four types of reference current signals $V_{Iref}$. However, the second embodiment is not intended to limit the disclosure. In other embodiments, the auto-selecting holding current circuit 100 can provide three types or more than four types of reference current signals $V_{Iref}$.

Figure 9:
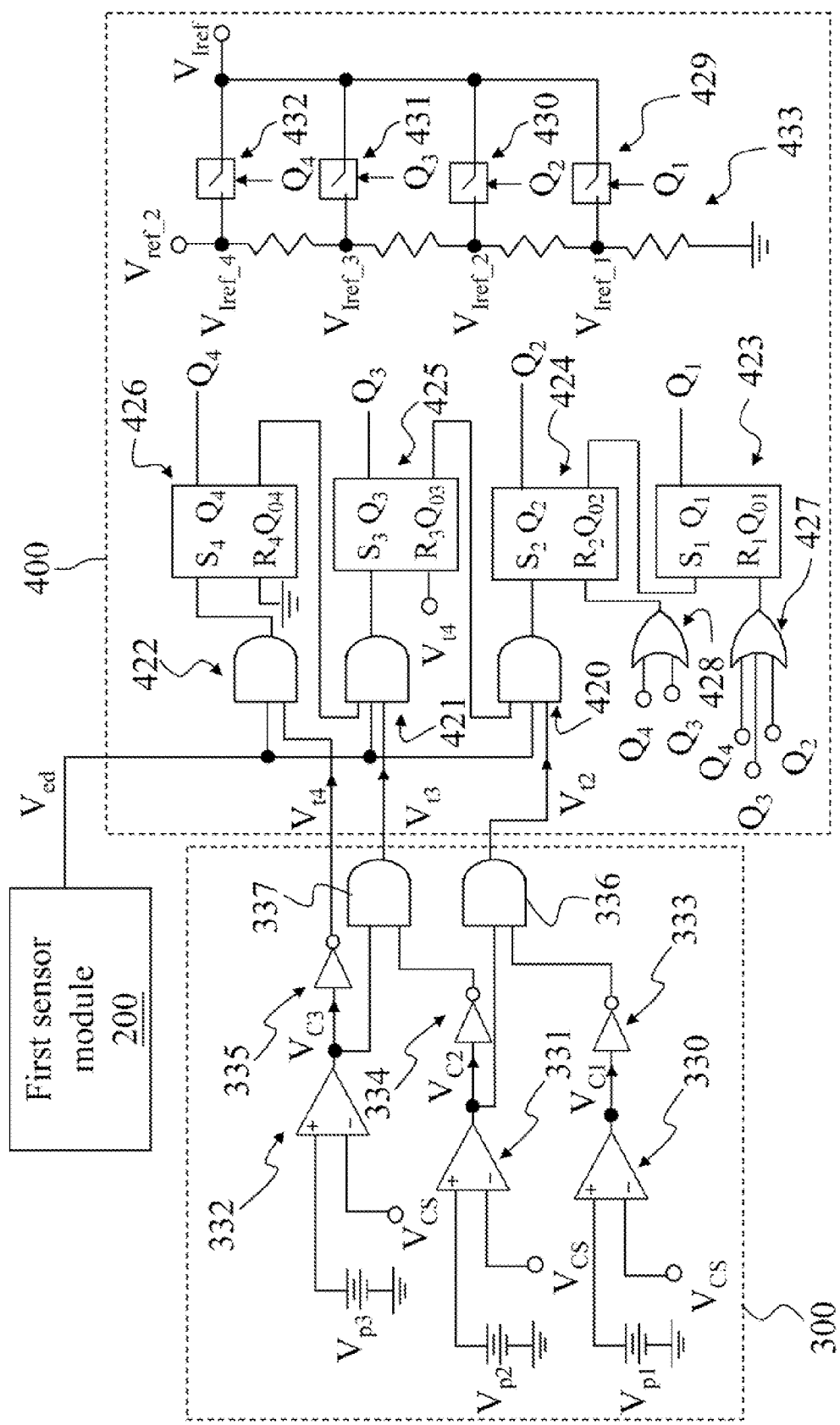
FIG. 9 is a schematic structural view of a circuit of a bleeder circuit according to a second embodiment of the disclosure.
Figure 11A:
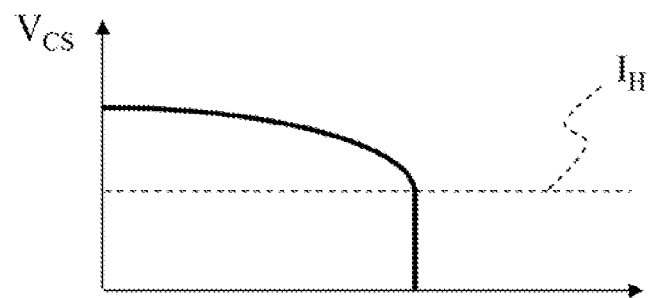
FIG. 11A to FIG. 11F are respectively time-sequence oscillograms of a current detector signal, a sense signal, a critical current signal and a reference current signal when a holding-current value of a TRIAC is between a second preset current signal and a third preset current signal according to FIG. 9.
Figure 11B:
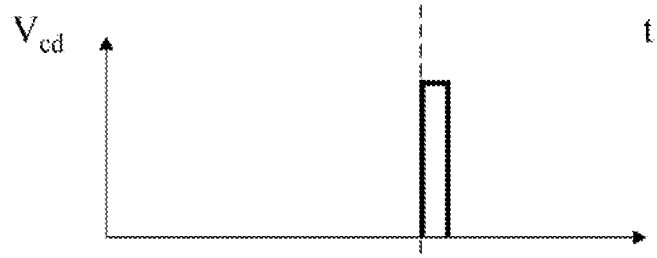
Figure 11C:
Figure 11D:
Figure 11E:
Figure 11F:
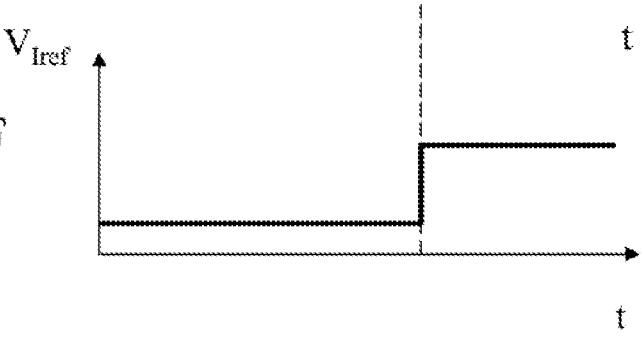

FIG. 9 is a schematic structural view of a circuit of an auto-selecting holding current circuit according to a second embodiment of the disclosure. In this embodiment, a second sensor module 300 comprises a comparator 330, a comparator 331, a comparator 332, a first NOT gate 333, a first NOT gate 334, a first NOT gate 335, a first AND gate 336 and a first AND gate 337. The comparator 330, the comparator 331 and the comparator 332 respectively receive a current detector signal $V_{CS}$ output by a current sensor 24. An input end of the first NOT gate 333 is coupled to an output end of the comparator 330. An output end of the first NOT gate 333 is coupled to an input end of the first AND gate 336. Another input end of the first AND gate 336 is coupled to an output end of the comparator 331. An input end of the first NOT gate 334 is coupled to the output end of the comparator 331. An output end of the first NOT gate 334 is coupled to an input end of the first AND gate 337. Another input end of the first AND gate 337 is coupled to an output end of the comparator 332. An input end of the first NOT gate 335 is coupled to the output end of the comparator 332, and an output end of the first NOT gate 335 is coupled to the reference voltage selecting circuit 400. The output end of the first NOT gate 335, the output end of the first AND gate 336 and the output end of the first AND gate 337 respectively output a critical current signal $V_{t4}$, a critical current signal $V_{t3}$ and a critical current signal $V_{t2}$ to the reference voltage selecting circuit 400.

In the embodiment, the reference voltage selecting circuit 400 may comprise a second AND gate 420, a second AND gate 421, a second AND gate 422, an RS flip-flop 423, an RS flip-flop 424, an RS flip-flop 425, an RS flip-flop 426, a first OR gate 427, a first OR gate 428, a switch element 429, a switch element 430, a switch element 431, a switch element 432 and a voltage divider 433. An input end of the second AND gate 420 is coupled to an output end of the first AND gate 336; another input end of the second AND gate 420 is coupled to a first sensor module 200; and further another input end of the second AND gate 420 is coupled to an output end $Q_{03}$ of the RS flip-flop 425. An output end of the second AND gate 420 is coupled to a set end $S_2$ of the RS flip-flop 424. An input end of the second AND gate 421 is coupled to an output end of the first AND gate 337; another input end of the second AND gate 421 is coupled to the first sensor module 200; and further another input end of the second AND gate 421 is coupled to an output end $Q_{04}$ of the RS flip-flop 426. An output end of the second AND gate 421 is coupled to a set end $S_3$ of the RS flip-flop 425. An input end of the second AND gate 422 is coupled to the output end of the first NOT gate 335; another input end of the second AND gate 422 is coupled to the first sensor module 200. An output end of the second AND gate 422 is coupled to a set end $S_4$ of the RS flip-flop 426.

An input end of the first OR gate 427 is coupled to an output end $Q_2$ of the RS flip-flop 424; another input end of the first OR gate 427 is coupled to an output end $Q_3$ of the RS flip-flop 425; and further another input end of the first OR gate 427 is coupled to an output end $Q_4$ of the RS flip-flop 426. An output end of the first OR gate 427 is coupled to a reset end $R_1$ of the RS flip-flop 427. An input end of the first OR gate 428 is coupled to the output end $Q_3$ of the RS flip-flop 425; another input end of the first OR gate 428 is coupled to the output end $Q_4$ of the RS flip-flop 426. An output end of the first OR gate 428 is coupled to a reset end $R_2$ of the RS flip-flop 424.

In addition, an output end $Q_{02}$ of the RS flip-flop 424 is coupled to a set end $S_1$ of the RS flip-flop 423. The output end $Q_4$ of the RS flip-flop 426 is coupled to a reset end $R_3$ of the RS flip-flop 425. The reset end $R_4$ of the RS flip-flop 426 is grounded. An output end $Q_1$ of the RS flip-flop 423 controls the switch element 429; the output end $Q_2$ of the RS flip-flop 424 controls the switch element 430; the output end $Q_3$ of the RS flip-flop 425 controls the switch element 431; and the output end $Q_4$ of the RS flip-flop 426 controls the switch element 432, so that the voltage divider 433 outputs a corresponding reference current signal $V_{Iref\_1}$, a reference current signal $V_{Iref\_2}$, a reference current signal $V_{Iref\_3}$ or a reference current signal $V_{Iref\_4}$.

In further detail, referring to FIG. 9, as well as FIG. 10A to FIG. 10F, FIG. 10A to FIG. 10F are respectively time-sequence oscillograms of the current detector signal $V_{CS}$, the sense signal $V_{cd}$, the critical current signals $V_{t1}$~$V_{t4}$ and the reference current signal $V_{Iref}$ in a case of the holding-current value of the TRIAC is greater than a third preset current signal value. When a current drop (namely the point H in FIG. 10A) is sensed by the first sensor module 200, the first sensor module 200 outputs a sense signal $V_{cd}$ (namely a pulse signal in FIG. 10B) to the second AND gate 420, the second AND gate 421 and the second AND gate 422. That is to say, the first sensor module 200 is used to detect a sudden drop time of the current detector signal $V_{CS}$. The comparator 330 receives the current detector signal $V_{CS}$ and outputs a comparison signal $V_{C1}$ after comparing the current detector signal $V_{CS}$ with a first preset current signal $V_{p1}$. The first NOT gate 333 receives the comparison signal $V_{C1}$ and outputs a reversed phase of the comparison signal $V_{C1}$ to the first AND gate 336. The comparator 331 receives the current detector signal $V_{CS}$ and outputs a comparison signal $V_{C2}$ to the first AND gate 336 and the first NOT gate 334 after comparing the current detector signal $V_{CS}$ with a second preset current signal $V_{p2}$. The first NOT gate 334 receives the comparison signal $V_{C2}$ and outputs a reversed phase of the comparison signal $V_{C2}$ to the first AND gate 337. The comparator 332 receives the current detector signal $V_{CS}$ and outputs a comparison signal $V_{V3}$ to the first AND gate 337 and the first NOT gate 335 after comparing the current detector signal $V_{CS}$ with a third preset current signal $V_{p3}$. The first NOT gate 335 receives the comparison signal $V_{C3}$ and outputs a critical current signal $V_{t4}$ to the second AND gate 422. The first AND gate 336 outputs a critical current signal $V_{t2}$ to the second AND gate 420 according to the reversed phase of the comparison signal $V_{C1}$ and the comparison signal $V_{C2}$. The first AND gate 337 outputs a critical current signal $V_{t3}$ to the second AND gate 421 according to the reversed phase of the comparison signal $V_{C2}$ and the comparison signal $V_{C3}$. The third preset current signal $V_{p3}$ is greater than the second preset current signal $V_{p2}$, and the second preset current signal $V_{p2}$ is greater than the first present current signal $V_{p1}$.

When the current detector signal $V_{CS}$ is greater than the third preset current signal $V_{p3}$, the critical current signal $V_{t4}$ is at a high level. When the critical current signal $V_{t4}$ is at the high level and the first sensor module 200 outputs the sense signal $V_{cd}$, the second AND gate 422 outputs the high level to the set end $S_4$ of the RS flip-flop 426, so that the output end $Q_4$ of the RS flip-flop 426 outputs the high level, the output end $Q_3$ of the RS flip-flop 425 outputs a low level, the output end $Q_2$ of the RS flip-flop 424 outputs the low level, and the output end $Q_1$ of the RS flip-flop 423 outputs the low level. Since the output end $Q_4$ of the RS flip-flop 426 outputs the high level, the output end $Q_3$ of the RS flip-flop 425 outputs the low level, the output end $Q_2$ of the RS flip-flop 424 outputs the low level, and the output end $Q_1$ of the RS flip-flop 423 outputs the low level, the switch element 432 is actuated, and therefore the voltage divider 433 outputs the corresponding reference current signal $V_{Iref\_4}$.

Referring to FIG. 9, as well as FIG. 11A to FIG. 11F, FIG. 11A to FIG. 11F are respectively time-sequence oscillograms of the current detector signal $V_{CS}$, the sense signal $V_{cd}$, the critical current signals $V_{t1}$~$V_{t4}$ and the reference current signal $V_{Iref}$ in a case of the holding-current value of the TRIAC being between a second preset current signal and a third preset current signal. When the current detector signal $V_{CS}$ is greater than the second preset current signal $V_{p2}$ and smaller than the third preset current signal $V_{p3}$, the critical current signal $V_{t4}$ is at the low level and the critical current signal $V_{t3}$ is at the high level. When the critical current signal $V_{t3}$ is at the high level and the first sensor module 200 outputs the sense signal $V_{cd}$, the second AND gate 422 outputs the low level to the set end $S_4$ of the RS flip-flop 426, so that the output end $Q_4$ of the RS flip-flop 426 outputs the low level, the output end $Q_3$ of the RS flip-flop 425 outputs the high level, the output end $Q_2$ of the RS flip-flop 424 outputs the low level, and the output end $Q_1$ of the RS flip-flop 423 outputs the low level. Since the output end $Q_4$ of the RS flip-flop 426 outputs the low level, the output end $Q_3$ of the RS flip-flop 425 outputs the high level, the output end $Q_2$ of the RS flip-flop 424 outputs the low level, and the output end $Q_1$ of the RS flip-flop 423 outputs the low level, the switch element 431 is actuated, and therefore the voltage divider 433 outputs the corresponding reference current signal $V_{Iref\_3}$.

Referring to FIG. 9, as well as FIG. 12A to FIG. 12F, FIG. 12A to FIG. 12F are respectively time-sequence oscillograms of the current detector signal $V_{CS}$, the sense signal $V_{cd}$, the critical current signals $V_{t1} \sim V_{t4}$ and the reference current signal $V_{Iref}$ in a case of the holding-current value of a TRIAC being between a first preset current signal and a second preset current signal. When the current detector signal $V_{CS}$ is between the first preset current signal $V_{p1}$ and the second preset current signal $V_{p2}$, the critical current signal $V_{t4}$ is at the low level, the critical current signal $V_{t3}$ is at the low level, and the critical current signal $V_{t2}$ is at the high level. When the critical current signal $V_{t2}$ is at the high level and the first sensor module 200 outputs the sense signal $V_{cd}$, the second AND gate 422 outputs the low level to the set end $S_4$ of the RS flip-flop 426, so that the output end $Q_4$ of the RS flip-flop 426 outputs the low level, the output end $Q_3$ of the RS flip-flop 425 outputs the low level, the output end $Q_2$ of the RS flip-flop 424 outputs the high level, and the output end $Q_1$ of the RS flip-flop 423 outputs the low level. Since the output end $Q_4$ of the RS flip-flop 426 outputs the low level, the output end $Q_3$ of the RS flip-flop 425 outputs the low level, the output end $Q_2$ of the RS flip-flop 424 outputs the high level, and the output end $Q_1$ of the RS flip-flop 423 outputs the low level, the switch element 430 is actuated, and therefore the voltage divider 433 outputs the corresponding reference current signal $V_{Iref\_2}$.

Referring to FIG. 9, as well as FIG. 13A to FIG. 13F, FIG. 13A to FIG. 13F are respectively time-sequence oscillograms of the current detector signal $V_{CS}$, the sense signal $V_{cd}$, the critical current signals $V_{t1}$-$V_{t4}$ and the reference current signal $V_{Iref}$ in a case of the holding-current value of the TRIAC being smaller than a first preset current signal. When the current detector signal $V_{CS}$ is smaller than the first preset current signal $V_{p1}$, the critical current signal $V_{t4}$ is at the low level, the critical current signal $V_{t3}$ is at the low level, and the critical current signal $V_{t2}$ is at the low level. When the critical current signal $V_{t2}$ is at the low level and the first sensor module 200 outputs the sense signal $V_{cd}$, the second AND gate 422 outputs the low level to the set end $S_4$ of the RS flip-flop 426, so that the output end $Q_4$ of the RS flip-flop 426 outputs the low level, the output end $Q_3$ of the RS flip-flop 425 outputs the low level, the output end $Q_2$ of the RS flip-flop 424 outputs the low level, and the output end $Q_1$ of the RS flip-flop 423 outputs the high level. Since the output end $Q_4$ of the RS flip-flop 426 outputs the low level, the output end $Q_3$ of the RS flip-flop 425 outputs the low level, the output end $Q_2$ of the RS flip-flop 424 outputs the low level, and the output end $Q_1$ of the RS flip-flop 423 outputs the high level, the switch element 429 is actuated, and therefore the voltage divider 433 outputs the corresponding reference current signal $V_{Iref\_1}$.

In addition, in order to reduce the number of the comparators comprised in the second sensor module, the design of the counter, decoder and preset threshold voltage selecting circuit may be used to achieve the same effect. For details, references may be made to the following description of the third embodiment and the fourth embodiment.

Figure 14:
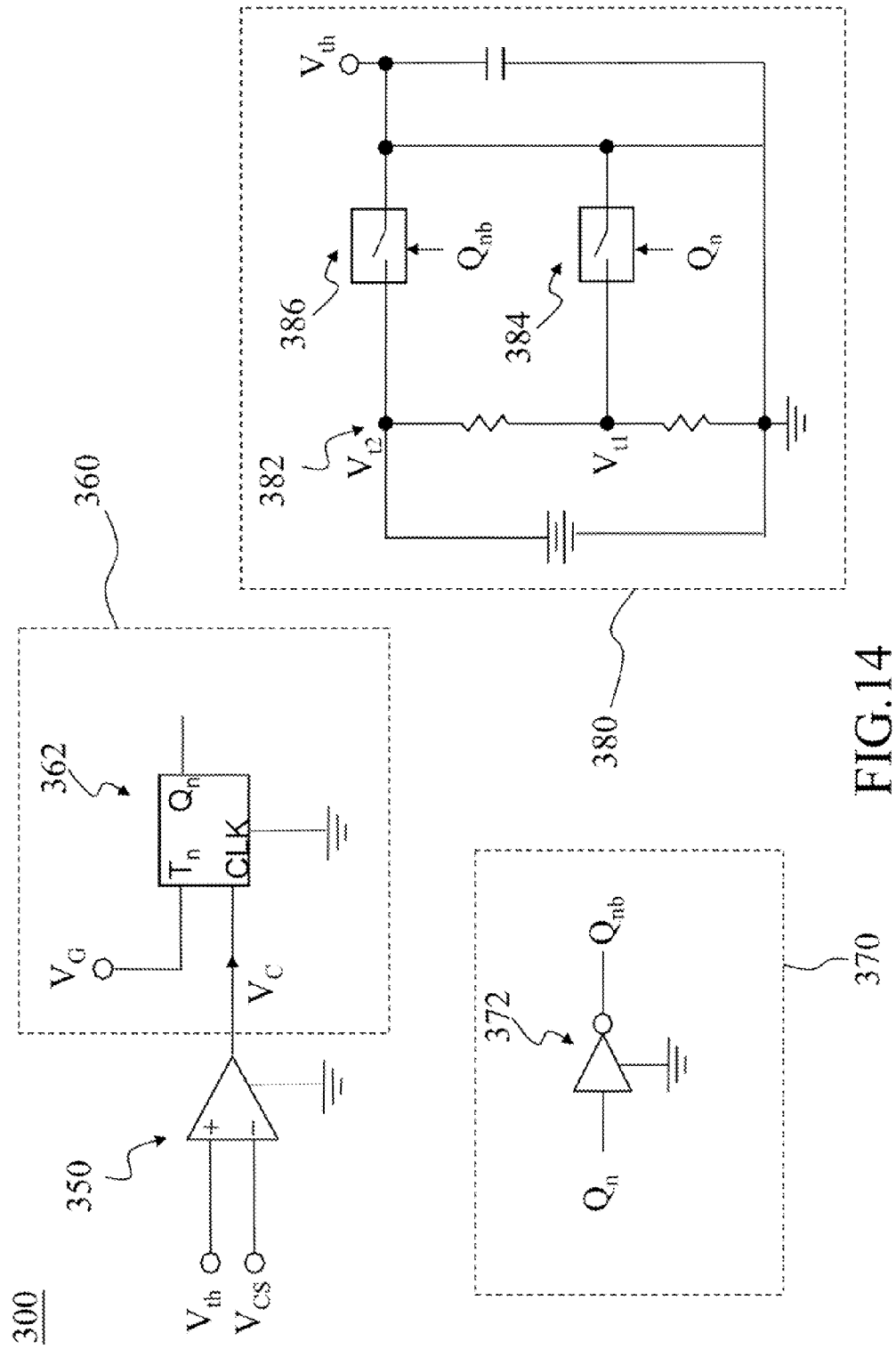
FIG. 14 is a schematic structural view of a circuit of an auto-selecting holding current circuit according to a third embodiment of the disclosure.

Referring to FIG. 14, FIG. 14 is a schematic structural view of a circuit of a auto-selecting holding current circuit according to a third embodiment of the disclosure. In the embodiment, the first sensor module 200 and the reference voltage selecting circuit 400 are the same as those in the first embodiment, and a second sensor module 300 comprises a comparator 350, a counter 360, a decoder 370 and a preset threshold voltage selecting circuit 380. The comparator 350 receives a current detector signal $V_{CS}$, and outputs a comparison signal $V_C$ after comparing the current detector signal $V_{CS}$ with a critical current signal $V_{th}$ (namely a critical current signal $V_{t1}$ or a critical current signal $V_{t2}$, in which the critical current signal $V_{t2}$ is greater than the critical current signal $V_{t1}$). The counter 360 performs cycle count and receives the comparison signal $V_C$ to output a count value in real time. The decoder 370 continuously receives the count value from the counter 360 and outputs a state signal (in this embodiment, the state signal is an output of an output end $Q_{nb}$ of the second NOT gate 372).

The preset threshold voltage selecting circuit 380 continuously receives the state signals output by the decoder 370 and outputs the critical current signal $V_{th}$. The counter 360 may also comprise a T flip-flop 362. However, the embodiment is not intended to limit the disclosure; that is to say, the counter 360 may also comprise a D flip-flop. A clock end CLK of the T flip-flop 362 is coupled to an output end of the comparator 350. An input end $T_n$ of the T flip-flop 362 is coupled to a voltage $V_G$ which is at a high level. The decoder 370 comprises a second NOT gate 372. An input end of the second NOT gate 372 is coupled to the counter 360, and the output end $Q_{nb}$ of the second NOT gate 372 is coupled to the preset threshold voltage selecting circuit 380. The preset threshold voltage selecting circuit 380 comprises a voltage dividing unit 382, a switch element 384 and a switch element 386. An output end of the counter 360 (namely an output end $Q_n$ of the T flip-flop 362) and an output end $Q_{nb}$ of the second NOT gate 372 respectively control the switch element 384 and the switch element 386, so that the voltage dividing unit 382 outputs the corresponding critical current signal $V_{th}$.

Referring to FIG. 14, it is assumed that the critical current signal is preset to $V_{t2}$, and the output end $Q_n$ of the T flip-flop 362 is preset to a low level and the output end $Q_{nb}$ of the second NOT gate 372 is preset to a high level, so the switch element 386 is actuated and switch element 384 is opened. Subsequently, the comparator 350 receives the current detector signal $V_{CS}$, and outputs the comparison signal $V_C$ after comparing the current detector signal $V_{CS}$ and the critical current signal $V_{t2}$. When the comparison signal $V_C$ is at the high level (that is, the current detector signal $V_{CS}$ is smaller than the critical current signal $V_{t2}$), the output end $Q_n$ of the T flip-flop 362 is at the high level, and the output end $Q_{nb}$ of the second NOT gate 372 is at the low level, so that the switch element 384 is actuated, the switch element 386 is opened, and the voltage dividing unit 382 outputs the corresponding critical current signal $V_{t1}$. When the comparison signal $V_C$ is at the low level (that is, the current detector signal $V_{CS}$ is greater than the critical current signal $V_{t1}$), the output end $Q_n$ of the T flip-flop 362 is at the low level (that is, the state signal $Q_n$ is at the low level) and the output end $Q_{nb}$ of the second NOT gate 372 is at the high level, so that the switch element 386 is actuated, the switch element 384 is opened, and the voltage dividing unit 382 outputs the corresponding critical current signal $V_{t2}$. Therefore, the switch element 384 and the switch element 386 can be actuated in order.

In the third embodiment, the second sensor module 300 comprises two types of critical current signals. However, the second sensor module 300 may also comprise more than two types of critical current signals. In the following fourth embodiment, it is taken as an example that an auto-selecting holding current circuit 100 provides four types of critical current signals. The fourth embodiment is not intended to limit the disclosure. The embodiments of the auto-selecting holding current circuit 100 may also accordingly provide three types or more than four types of reference current signals.

Figure 15A:
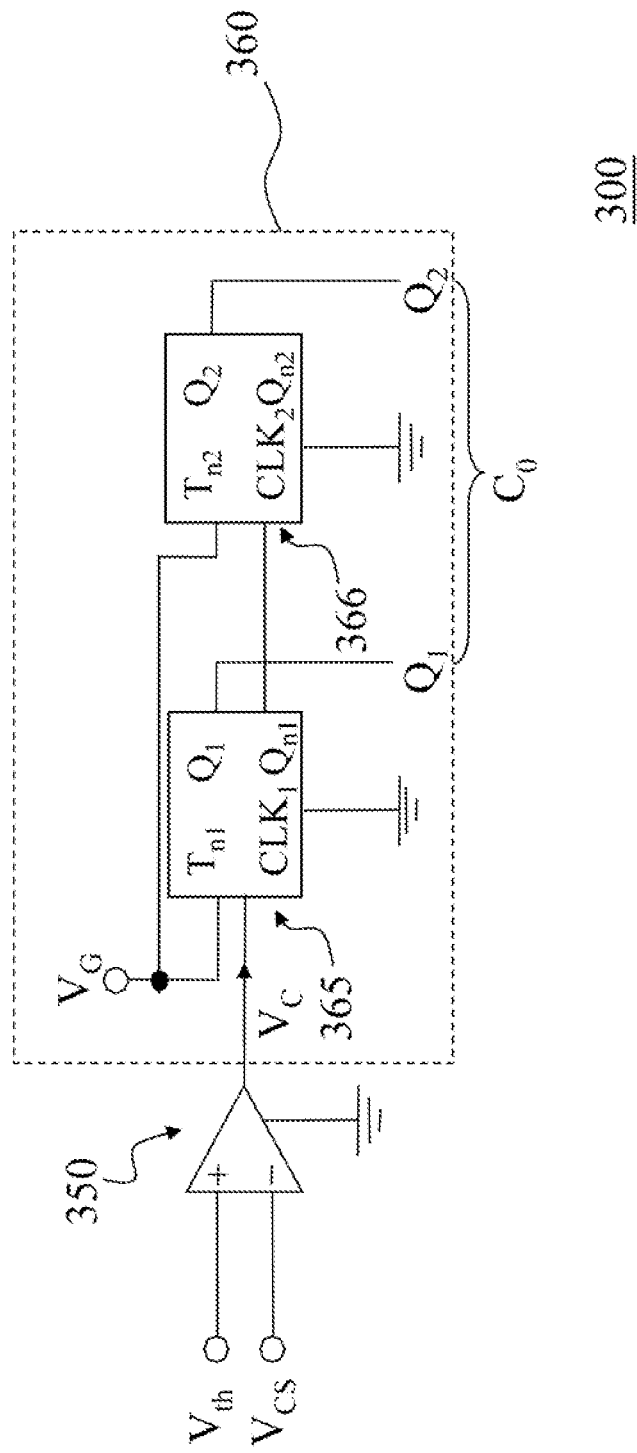
FIG. 15A is a schematic structural view of a circuit of a comparator and a counter of a auto-selecting holding current circuit according to a fourth embodiment of the disclosure.
Figure 15B:
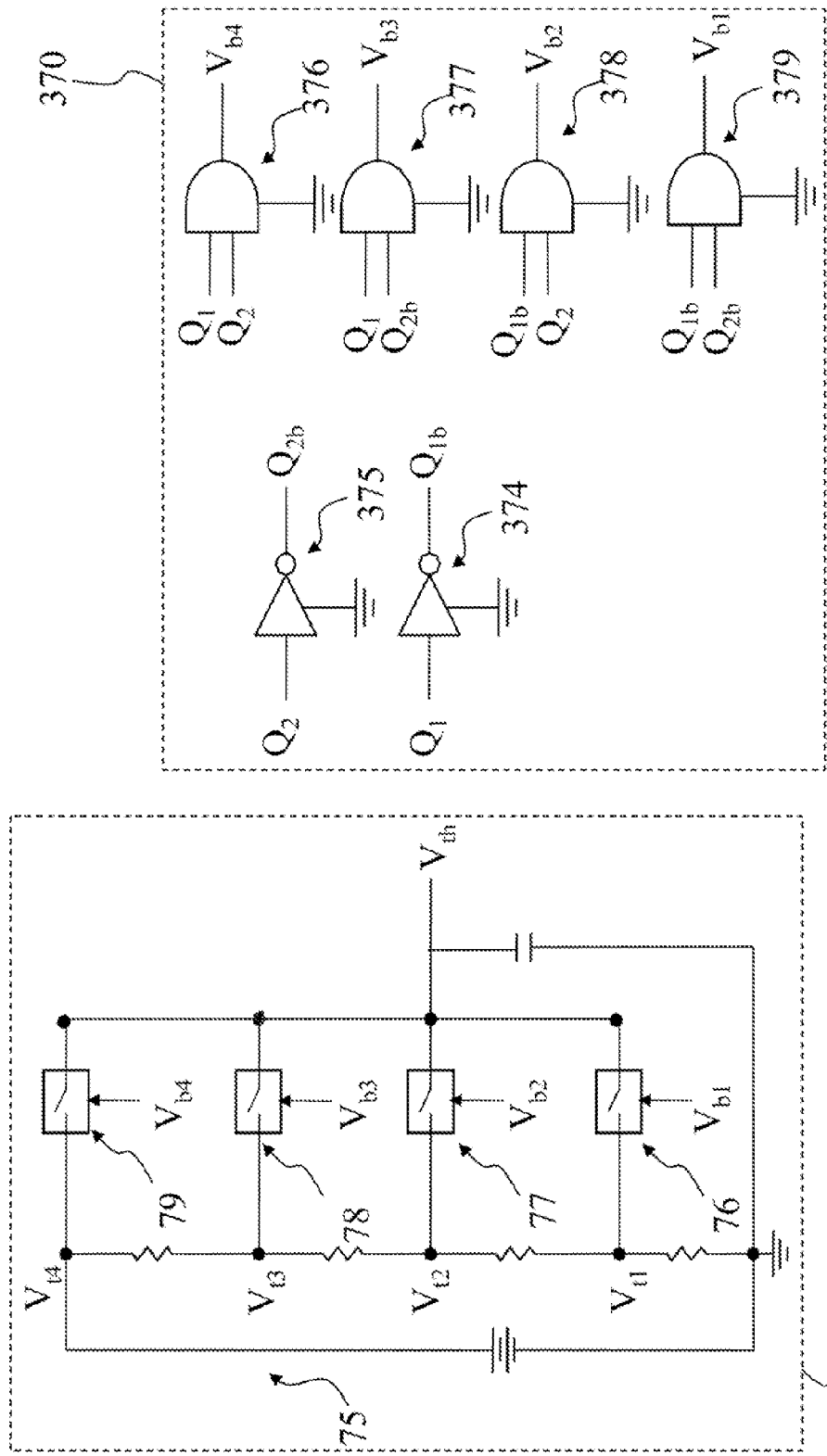
FIG. 15B is a schematic structural view of a circuit of a decoder and a preset threshold voltage selecting circuit of a auto-selecting holding current circuit according to a fourth embodiment of the disclosure.

Referring to FIG. 15A and FIG. 15B, FIG. 15A and FIG. 15B are respectively schematic structural views of circuits of a comparator, a counter, a decoder and a preset threshold voltage selecting circuit of a auto-selecting holding current circuit according to a fourth embodiment of the disclosure. In the embodiment, the first sensor module 200 and the reference voltage selecting circuit 400 are the same as those in the second embodiment, and a second sensor module 300 comprises a comparator 350, a counter 360, a decoder 370 and a preset threshold voltage selecting circuit 380. The comparator 350 receives a current detector signal $V_{CS}$, and outputs a comparison signal $V_C$ after comparing the current detector signal $V_{CS}$ with a critical current signal $V_{th}$. The counter 360 performs cycle count and receives the comparison signal $V_C$, so as to output a count value $C_o$ in real time. The decoder 370 continuously receives the count value $C_o$ and outputs a state signal (in this embodiment, the state signal is $V_{b1}$, $V_{b2}$, $V_{b3}$ or $V_{b4}$). The preset threshold voltage selecting circuit 380 continuously receives the state signal and outputs the critical current signal $V_{th}$ (namely, one of the critical current signal $V_{t1}$, the critical current signal $V_{t2}$, the critical current signal $V_{t3}$ and the critical current signal $V_{t4}$, wherein the critical current signal $V_{t4}$ is greater than the critical current signal $V_{t3}$, the critical current signal $V_{t3}$ is greater than the critical current signal $V_{t2}$, and the critical current signal $V_{t2}$ is greater than the critical current signal $V_{t1}$).

The counter 360 comprises a T flip-flop 365 and a T flip-flop 366. A clock end $CLK_1$ of the T flip-flop 365 is coupled to an output end of the comparator 350; an output end $Q_{n1}$ of the T flip-flop 365 is coupled to a clock end $CLK_2$ of the T flip-flop 366, and an input end $T_{n1}$ of the T flip-flop 365 and an input end $T_{n2}$ of the T flip-flop 366 are coupled to a voltage source $V_G$ which is at a high level.

The decoder 370 comprises a second NOT gate 374, a second NOT gate 375, a third AND gate 376, a third AND gate 377, a third AND gate 378 and a third AND gate 379. An input end of the second NOT gate 374 is coupled to an output end $Q_1$ of the T flip-flop 365, and an output end $Q_{1b}$ of the second NOT gate 374 is coupled to an input end of the third AND gate 378 and an input end of the third AND gate 379. An input end of the second NOT gate 375 is coupled to an output end $Q_2$ of the T flip-flop 366, and an output end $Q_{2b}$ of the second NOT gate 375 is coupled to an input end of the third AND gate 377 and an input end of the third AND gate 379. The output end $Q_1$ of the T flip-flop 365 is coupled to an input end of the third AND gate 376 and an input end of the third AND gate 377. The output end $Q_2$ of the T flip-flop 366 is coupled to an input end of the third AND gate 376 and an input end of the third AND gate 378. The preset threshold voltage selecting circuit 380 comprises a voltage dividing unit 75, a switch element 76, a switch element 77, a switch element 78 and a switch element 79. An output end of the third AND gate 376, an output end of the third AND gate 377, an output end of the third AND gate 378 and an output end of the third AND gate 379 respectively control the voltage dividing unit 75, the switch element 76, the switch element 77, the switch element 78 and the switch element 79, wherein the output end of the third AND gate 376 is used for output the state signal $V_{b4}$, the output end of the third AND gate 377 is used for output the state signal $V_{b3}$, the output end of the third AND gate 378 is used for output the state signal $V_{b2}$ and the output end of the third AND gate 379 is used for output the state signal $V_{b1}$.

It is assumed that the critical current signal is preset to $V_{t4}$, the output end $Q_1$ of the T flip-flop 365 is preset to the low level, and the output end $Q_2$ of the T flip-flop is preset to the low level, so the switch element 79 is actuated. Subsequently, the comparator 350 receives the current detector signal $V_{CS}$, and outputs the comparison signal $V_C$ after comparing the current detector signal $V_{CS}$ and the critical current signal $V_{t4}$. Then, when the comparison signal $V_C$ is at the high level (that is, the current detector signal $V_{CS}$ is smaller than the critical current signal $V_{t4}$), the output end $Q_1$ of the T flip-flop 365 is at the high level, and the output end $Q_2$ of the T flip-flop 366 is at the low level, so that the switch element 78 is actuated, and the voltage dividing unit 382 outputs the corresponding critical current signal $V_{t3}$. Then, when the comparison signal $V_C$ is at the high level (that is, the current detector signal $V_{CS}$ is smaller than the critical current signal $V_{t3}$), the output end $Q_1$ of the T flip-flop 365 is at the low level, and the output end $Q_2$ of the T flip-flop 366 is at the high level, so that the switch element 77 is actuated, and the voltage dividing unit 382 outputs the corresponding critical current signal $V_{t2}$. Then, when the comparison signal $V_C$ is at the high level (that is, the current detector signal $V_{CS}$ is smaller than the critical current signal $V_{t2}$), the output end $Q_1$ of the T flip-flop 365 is at the high level, and the output end $Q_2$ of the T flip-flop 366 is at the high level, so that the switch element 76 is actuated, and the voltage dividing unit 382 outputs the corresponding critical current signal $V_{t1}$. Then, when the comparison signal $V_C$ is at the high level (that is, the current detector signal $V_{CS}$ is greater than the critical current signal $V_{t1}$), the output end $Q_1$ of the T flip-flop 365 is at the low level, and the output end $Q_2$ of the T flip-flop 366 is at the low level, so that the switch element 79 is actuated, and the voltage dividing unit 382 outputs the corresponding critical current signal $V_{t4}$. Therefore, the switch element 76, the switch element 77, the switch element 78 and the switch element 79 can be actuated in order.

The auto-selecting holding current circuit according to the disclosure is applicable to a converter of any type. Through the sense signal output by a first sensor and the critical current signal output by the second sensor module, the reference voltage selecting circuit obtains a holding-current value range of the TRIAC to output the corresponding reference current signal to the bleeder circuit, so that the bleeder circuit dynamically adjusts a pulse modulation signal to maintain the normal operation of the TRIAC. In order to reduce the number of the comparators comprised in the second sensor module, the second sensor module may output the critical current signal through the design of the counter, decoder and preset threshold voltage selecting circuit.

What is claimed is:

1. An auto-selecting holding current circuit applicable to a converter, wherein an input voltage which is input to a primary side of the converter is adjusted by Triode for Alternating Current (TRIAC), the primary side has a bleeder circuit, the TRIAC has a holding-current value, the bleeder circuit makes an input current flowing through the TRIAC greater than or equal to the holding-current value according to a current detector signal and a reference current signal, the current detector signal corresponds to the input current; and the auto-selecting holding current circuit comprises:

a first sensor module (current drop detector), used to detect a current drop time of the current detector signal or a voltage drop time of the input voltage to output a sense signal ($V_{cd}$);

a second sensor module (current range detector), used to receive the current detector signal to output a critical current signal ($V_{th}$), wherein the critical current signal is used to judge a current value range of the holding-current value; and a reference voltage selecting circuit, used to output the reference current signal to the bleeder circuit according to the sense signal and the critical current signal, so that the bleeder circuit maintains the input current greater than or equal to the holding-current value.

2. The auto-selecting holding current circuit according to claim 1, wherein the first sensor module comprises a differentiator, and the differentiator detects the current drop time or the voltage drop time to output the sense signal.

3. The auto-selecting holding current circuit according to claim 1, wherein the second sensor module comprises a comparator and a first NOT gate, the comparator receives the current detector signal and outputs a comparison signal after comparing the current detector signal with a preset current signal, and the first NOT gate receives the comparison signal and outputs the critical current signal.

4. The auto-selecting holding current circuit according to claim 3, wherein the reference voltage selecting circuit comprises a second AND gate, a first reset-set (RS) flip-flop, a second RS flip-flop, two switch elements and a voltage divider; two input ends of the second AND gate are respectively coupled to the first sensor module and the second sensor module, an output end of the second AND gate is coupled to a set end of the first RS flip-flop, an output end of the first RS flip-flop is coupled to a reset end of the second RS flip-flop, an output end of the second RS flip-flop and the output end of the first RS flip-flop respectively control each switch element, so that the voltage divider outputs the corresponding reference current signal.

5. The auto-selecting holding current circuit according to claim 1, wherein the second sensor module comprises (N+1) comparators, (N+1) first NOT gates and N first AND gates, an input end of each first NOT gate is respectively coupled to an output end of each comparator, an output end of the Kth first NOT gate is respectively coupled to an input end of the Kth first AND gate, another input end of the Kth first AND gate is coupled to the output end of the (K+1)th comparator, the output end of the (K+1)th first NOT gate and an output end of each first AND gate output the critical current signal, N is a positive integer, and 1≤K≤N.

6. The auto-selecting holding current circuit according to claim 5, wherein the reference voltage selecting circuit comprises (N+1) second AND gates, (N+2) RS flip-flops, a first OR gate, (N+2) switch elements and a voltage divider, two input ends of the Kth second AND gate are respectively coupled to the output end of the Kth first AND gate and the first sensor module, two input ends of the (K+1)th second AND gate are respectively coupled to the output end of the (K+1)th first AND gate and the first sensor module, an output end of the Kth second AND gate is coupled to a set end of the (K+1)th RS flip-flop, an output end of each of the second RS flip-flop to the (K+2)th RS flip-flop is coupled to an input end of the first OR gate, an output end of the first OR gate is coupled to a reset end of the first RS flip-flop, the output ends of the (N+2) RS flip-flops respectively control the (N+2) switch elements, so that the voltage divider outputs the corresponding reference current signal.

7. The auto-selecting holding current circuit according to claim 1, wherein the second sensor module comprises:
a comparator, used to receive the current detector signal and output a comparison signal after comparing the current detector signal with the critical current signal;
a counter, used to perform cycle count and receive the comparison signal to output a count value in real time;
a decoder, used to continuously receive the count value to output a state signal; and
a preset threshold voltage selecting circuit, used to continuously receive the state signal to output the critical current signal.

8. The auto-selecting holding current circuit according to claim 7, wherein the counter comprises a T flip-flop, and a clock end of the T flip-flop is coupled to an output end of the comparator.

9. The auto-selecting holding current circuit according to claim 8, wherein the decoder comprises a second NOT gate, an input end of the second NOT gate is coupled to the counter, and an output end of the second NOT gate is coupled to the preset threshold voltage selecting circuit.

10. The auto-selecting holding current circuit according to claim 9, wherein the preset threshold voltage selecting circuit comprises a voltage dividing unit and two switch elements, and an output end of the counter and the output end of the second NOT gate respectively control each switch element, so that the voltage dividing unit outputs the corresponding critical current signal.

* * * * *